(12) United States Patent
Shigeta et al.

(10) Patent No.: US 10,507,817 B2
(45) Date of Patent: Dec. 17, 2019

(54) ELECTRIC MOTOR-DRIVEN BOOSTER

(71) Applicant: HITACHI AUTOMOTIVE SYSTEMS, LTD., Ibaraki (JP)

(72) Inventors: Hiroshi Shigeta, Kai (JP); Daichi Nomura, Kawasaki (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 129 days.

(21) Appl. No.: 15/511,455

(22) PCT Filed: Nov. 4, 2015

(86) PCT No.: PCT/JP2015/081011
§ 371 (c)(1),
(2) Date: Mar. 15, 2017

(87) PCT Pub. No.: WO2016/072413
PCT Pub. Date: May 12, 2016

(65) Prior Publication Data
US 2017/0291590 A1    Oct. 12, 2017

(30) Foreign Application Priority Data
Nov. 4, 2014 (JP) .................. 2014-224371

(51) Int. Cl.
| B60T 13/74 | (2006.01) |
| F15B 7/08 | (2006.01) |
| F16H 25/22 | (2006.01) |

(52) U.S. Cl.
CPC .............. B60T 13/745 (2013.01); F15B 7/08 (2013.01); F16H 25/2204 (2013.01)

(58) Field of Classification Search
CPC .......................... B60T 13/745; F16H 25/2204
See application file for complete search history.

(56) References Cited

U.S. PATENT DOCUMENTS 6,047,546 A * 4/2000 Takeyama ............. B60T 13/745
  60/533
9,758,143 B2 * 9/2017 Ohnishi ................ B60T 8/3685
(Continued)

FOREIGN PATENT DOCUMENTS

| JP | 2007-191133 | 8/2007 |
| JP | 2013-244961 | 12/2013 |

(Continued)

OTHER PUBLICATIONS

International Search Report dated Jan. 12, 2016 in International Application No. PCT/JP2015/081011.

Primary Examiner — Nathaniel E Wiehe
Assistant Examiner — Matthew Wiblin
(74) Attorney, Agent, or Firm — Wenderoth, Lind & Ponack, L.L.P.

(57) ABSTRACT

An electric motor (2) is controlled according to the stroke of an input rod (30) moved in response to an operation of a brake pedal. The rotation of the electric motor is transmitted through a belt transmission mechanism (45) to a ball-screw mechanism (38) to propel a primary piston (10), thereby generating a brake hydraulic pressure in a master cylinder (4). The belt transmission mechanism has pulleys (45A, 45B), one of which is secured to an output shaft of the electric motor. The output shaft and a nut member (39) of the ball-screw mechanism are held by bearings (42A, 42B and 42C) secured to a rear housing (3B) which is a single member. Thus, before an electric motor-driven booster (1) is assembled, the belt transmission mechanism can be subassembled to the rear housing. Therefore, a belt (46) can be adjusted for tension in the state of a subassembly.

7 Claims, 4 Drawing Sheets

(56) References Cited

U.S. PATENT DOCUMENTS

| | | | |
|---|---|---|---|
| 2003/0024245 A1* | 2/2003 | Fulks | B60T 13/745 60/545 |
| 2007/0199436 A1 | 8/2007 | Ikeda et al. | |
| 2008/0092679 A1* | 4/2008 | Tateishi | F16H 25/2015 74/89.23 |
| 2013/0192222 A1* | 8/2013 | Nomura | B60T 13/745 60/545 |
| 2015/0061363 A1* | 3/2015 | Murayama | B60T 8/17 303/14 |
| 2015/0285347 A1* | 10/2015 | Ohnishi | H02K 7/06 74/89.36 |

FOREIGN PATENT DOCUMENTS

| | | |
|---|---|---|
| JP | 2014-46758 | 3/2014 |
| JP | 2014-46853 | 3/2014 |

* cited by examiner

ELECTRIC MOTOR-DRIVEN BOOSTER

TECHNICAL FIELD

The present invention relates to an electric motor-driven booster incorporated in a brake system of a vehicle, e.g. an automobile, to generate a brake hydraulic pressure by driving a piston in a master cylinder with an electric motor according to an amount by which a brake pedal is operated.

BACKGROUND ART

A publicly known electric motor-driven booster is disclosed, for example, in Patent Literature 1. The electric motor-driven booster disclosed in Patent Literature 1 operates as follows. According to an amount of driver's operation of a brake pedal, a controller controls an electric motor. Rotary motion of the electric motor is converted into a rectilinear motion through a ball-screw mechanism, which is a rotation-rectilinear motion conversion mechanism. With the rectilinear motion, the ball-screw mechanism propels a piston in a master cylinder, and thus the master cylinder generates a brake hydraulic pressure. Further, in the electric motor-driven booster, the rotational force of the electric motor is transmitted to the ball-screw mechanism through a transmission mechanism comprising a belt and pulleys.

CITATION LIST

Patent Literature

Patent Literature 1: Japanese Patent Application Laid-Open Publication No. 2007-191133

SUMMARY OF INVENTION

Technical Problem

In a conventional electric motor-driven booster in which power is transmitted through a belt transmission mechanism, an opening for belt tension adjustment is provided in the housing of the booster, and after the electric motor-driven booster has been assembled, the belt is adjusted for tension. Accordingly, the conventional electric motor-driven booster suffers from the problem that because the opening needs to be closed and sealed, there is an increase in the number of man-hours required for assembly, and the parts count also increases.

An object of the present invention is to provide an electric motor-driven booster capable of being manufactured with increased efficiency.

Solution to Problem

The present invention provides an electric motor-driven booster in which a rotary motion of an electric motor is transmitted through a rotation transmission mechanism to a rotation-rectilinear motion conversion mechanism where the rotary motion is converted into a rectilinear motion to move a piston in a master cylinder. The rotation transmission mechanism and the rotation-rectilinear motion conversion mechanism are accommodated in a housing formed by combining together at least two housing members. Rotary members of the rotation transmission mechanism and rotation-rectilinear motion conversion mechanism are held by one of the at least two housing members.

Advantages of Invention

According to the present invention, the electric motor-driven booster can be manufactured with increased efficiency.

DESCRIPTION OF EMBODIMENTS

One embodiment of the present invention will be explained below in detail on the basis of the drawings.

Figure 1:
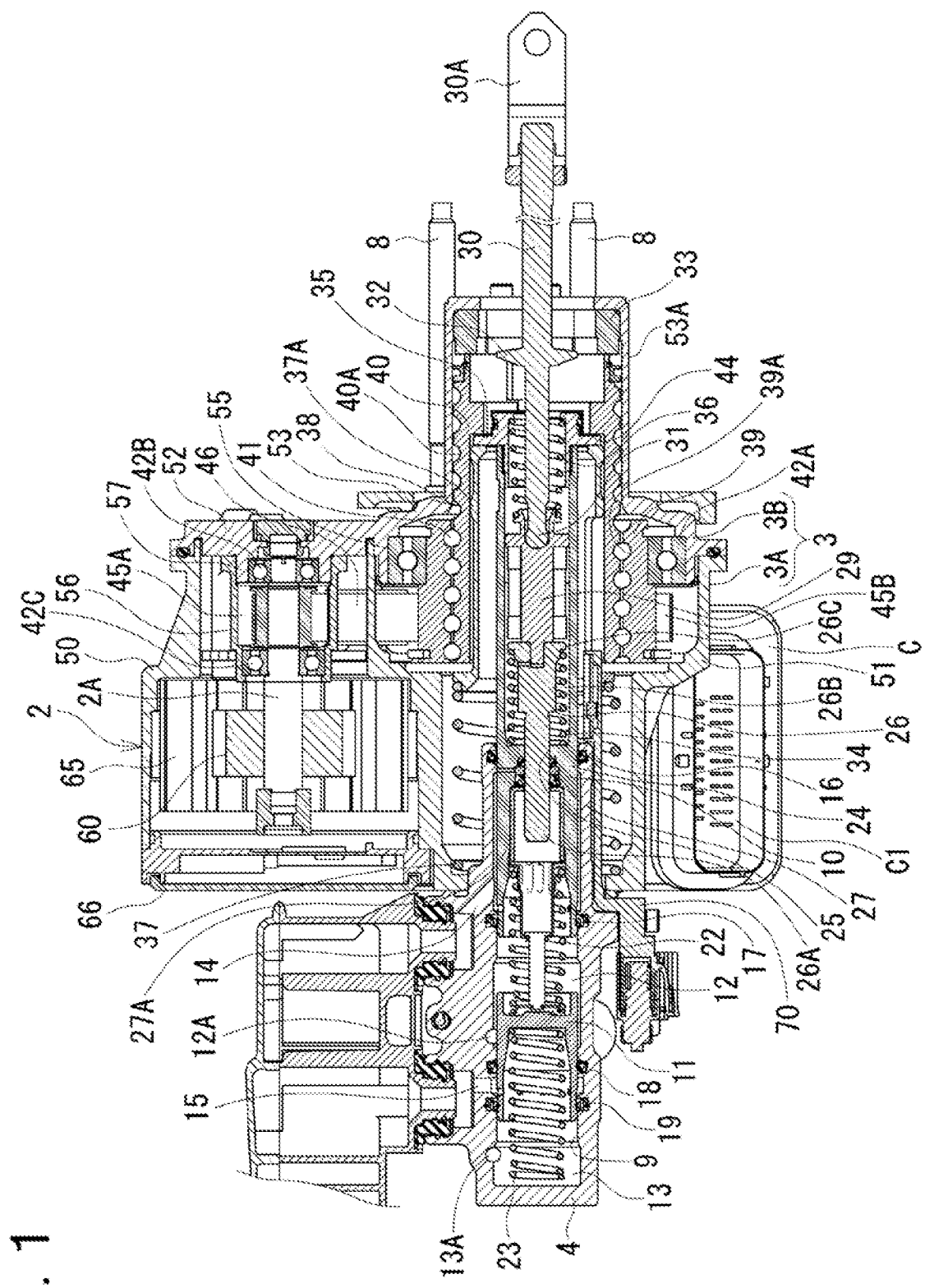
FIG. 1 is a vertical sectional view of an electric motor-driven booster according to one embodiment of the present invention.
Figure 2:
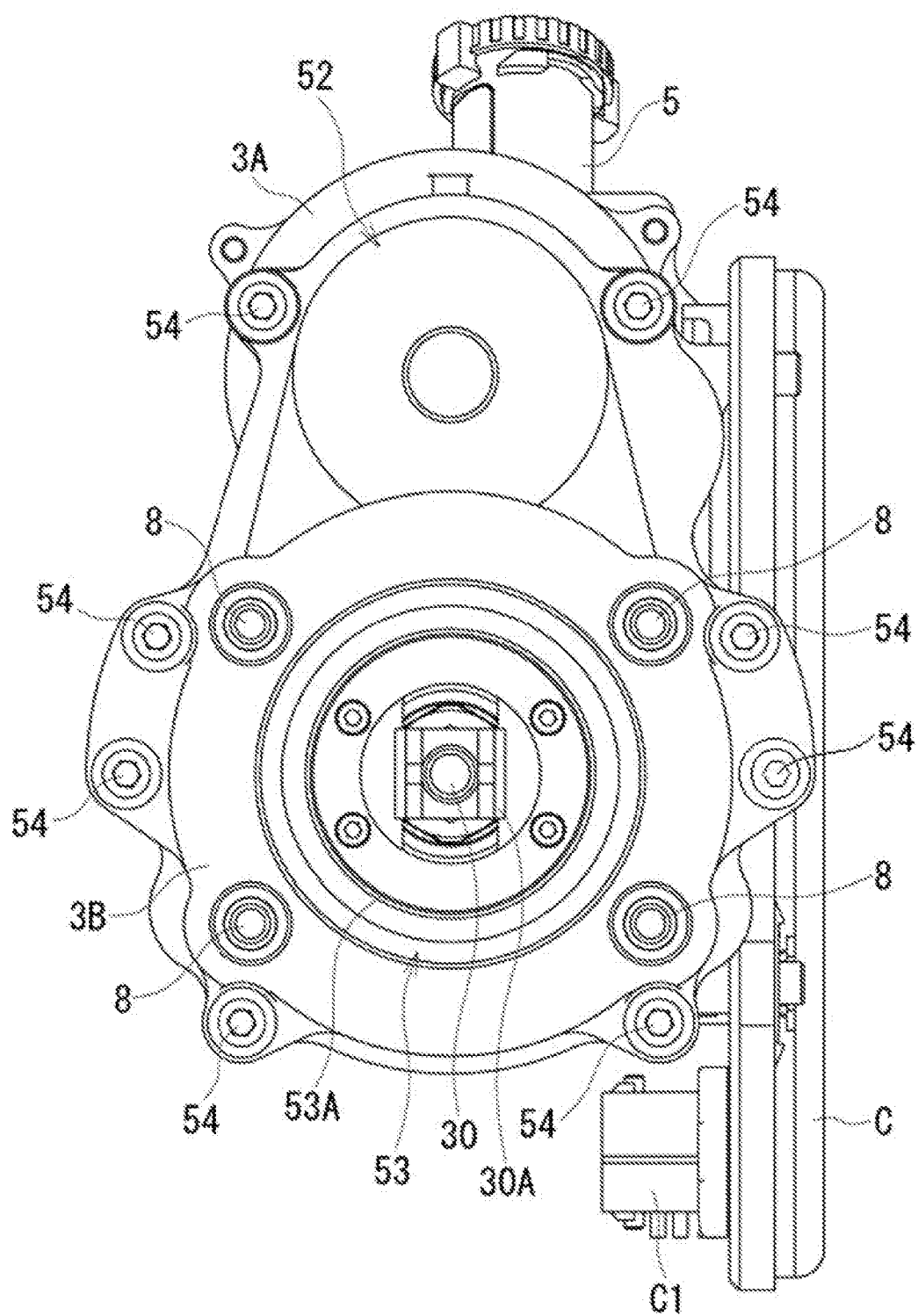
FIG. 2 is a rear view of the electric motor-driven booster shown in FIG. 1.

As shown in FIGS. 1 and 2, an electric motor-driven booster 1 according to this embodiment is joined to a master cylinder 4 as one unit. The electric motor-driven booster 1 propels a primary piston 10 (piston) in the master cylinder 4 to generate a brake hydraulic pressure. The electric motor-driven booster 1 has an input rod 30 connected to a brake pedal (not shown) through a clevis 30A, a ball-screw mechanism 38, which is a rotation-rectilinear motion conversion mechanism, and a housing 3 accommodating the input rod 30 and the ball-screw mechanism 38. The housing 3 has an electric motor 2 secured thereto as a drive source and further has a controller C secured thereto as one unit.

The housing 3 is formed of an aluminum alloy or the like. The housing 3 has a split structure. That is, the housing 3 comprises a front housing 3A and a rear housing 3B, which are combined together. The front housing 3A has a structure comprising a motor casing part 50 accommodating the electric motor and a cylindrical front body part 51 to which the master cylinder 4 is joined and which accommodates the ball-screw mechanism 38. The motor casing part 50 and the front body part 51 are joined together as one unit. The front housing 3A is a master cylinder 4 side housing member in this embodiment. The front housing 3A has the controller C secured to the respective sides of the motor casing part 50 and the front body part 51. The motor casing part 50 and the front body part 51 are disposed with their center axes arranged side by side in the vertical direction in the figure. The controller C extends downward (in the figure) beyond the front body part 51 disposed underneath the motor casing part 50. A part of the controller C that extends downward beyond the front body part 51 is provided with a connector C1 for connecting various wirings such as a power line and CAN wiring to the controller C.

The rear housing 3B has a structure comprising a motor cover part 52 and a rear body part 53, which are joined together as one unit. The motor cover part 52 is joined to the motor casing part 50 of the front housing 3A. The rear body part 53 is joined to the front body part 51 of the front housing 3A. The rear body part 53 has a circular cylindrical portion 53A into which the input rod 30 is inserted. The rear housing 3B is a brake pedal-side housing member in this embodiment. The front housing 3A and the rear housing 3B are joined together with a plurality of bolts 54 inserted through flange portions formed around the joints of the front and rear housings 3A and 3B, thereby closing the interior of the housing 3. The structure of the housing 3 will be explained later in more detail.

The electric motor-driven booster 1 is disposed in an engine room of a vehicle, with the cylindrical portion 53A of the rear housing 3B extended into a vehicle compartment through a dash panel (not shown), which is a partition between the engine room and the compartment. The electric motor-driven booster 1 is secured to the dash panel with a plurality of stud bolts provided on a mounting part of the rear housing 3B through which the rear housing 3B is mounted to the vehicle body.

The master cylinder 4 has a bottomed cylinder bore 9 formed therein. The master cylinder 4 is joined to the front housing 3A in such a way that an end portion of the master cylinder 4 on the side thereof closer to the opening of the cylinder bore 9 is inserted into an opening in the bottom of the front housing 3A. The master cylinder 4 has a substantially circular cylindrical primary piston 10 provided in the opening-side part of the cylinder bore 9. The primary piston 10 has a cup-shaped distal end portion disposed in the cylinder bore 9. The master cylinder 4 further has a cup-shaped secondary piston 11 disposed in the bottom-side part of the cylinder bore 9. The proximal end portion of the primary piston 10 projects from the opening of the master cylinder 4 into the housing 3 and extends into the cylindrical portion 53A of the rear housing 3B. The master cylinder 4 has a primary chamber 12 formed in the cylinder bore 9 between the primary piston 10 and the secondary piston 11. The primary chamber 12 constitutes a pressure chamber for generating a hydraulic pressure. The master cylinder 4 further has a secondary chamber 13 formed in the cylinder bore 9 between the bottom of the cylinder bore 9 and the secondary piston 11. The secondary chamber 13 constitutes a pressure chamber for generating a hydraulic pressure. The primary chamber 12 and the secondary chamber 13 are connected to wheel cylinders (not shown) of wheels from hydraulic pressure ports 12A and 13A of the master cylinder 4 through hydraulic pressure circuits of two systems. The master cylinder 4 is a tandem master cylinder having two pressure chambers.

Further, the master cylinder 4 is provided with reservoir ports 14 and 15 for respectively connecting the primary chamber 12 and the secondary chamber 13 to a reservoir 5. The cylinder bore 9 has annular piston seals 16, 17, 18 and 19 fitted to the inner peripheral surface thereof at predetermined axial spaces to seal between the cylinder bore 9 and the primary and secondary pistons 10 and 11. The piston seals 16 and 17 are disposed to axially face each other across the reservoir port 14. When the primary piston 10 is in a non-braking position shown in FIG. 1, the primary chamber 12 communicates with the reservoir port 14 through a piston port 20 provided in the sidewall of the primary piston 10. When the primary piston 10 advances from the non-braking position and consequently the piston port 20 reaches the position of the piston seal 17, the primary chamber 12 is cut off from the reservoir port 14 by the piston seal 17, thus generating a hydraulic pressure.

Similarly, the remaining two piston seals 18 and 19 are disposed to axially face each other across the reservoir port 15. When the secondary piston 11 is in a non-braking position shown in FIG. 1, the secondary chamber 13 communicates with the reservoir port 15 through a piston port 21 provided in the sidewall of the secondary piston 11. When the secondary piston 11 advances from the non-braking position, the secondary chamber 13 is cut off from the reservoir port 15 by the piston seal 19, thus generating a hydraulic pressure.

Between the primary piston 10 and the secondary piston 11 is interposed a spring 22 urging the primary and secondary pistons 10 and 11 away from each other. Between the bottom of the cylinder bore 9 and the secondary piston 11 is interposed a spring 23 urging the secondary piston 11 toward the opening side of the cylinder bore 9.

The primary piston 10 is formed in a substantially circular cylindrical shape as a whole and has an intermediate wall 24 formed therein at an axially center position. The intermediate wall 24 has a guide bore 25 axially extending therethrough. The guide bore 25 is slidably and fluid-tightly fitted with a small-diameter portion 26A of a stepped input piston 26 having the small-diameter portion 26A at its distal end side and a large-diameter portion 26B at its rear end side. The area between the small-diameter portion 26A of the input piston 26 and the guide bore 25 is sealed by a seal 27. The seal 27 is held in the primary piston 10 by a seal retaining member 27A. The input piston 26 has an outward flange-shaped spring retaining portion 26C formed at the rear end of the large-diameter portion 26B. The input piston 26 has the distal end of the small-diameter portion 26A facing into the primary chamber 12 of the master cylinder 4 and is axially movable relative to the primary piston 10.

The primary piston 10 has an input plunger 29 disposed in a rear portion thereof, i.e. a brake pedal-side portion thereof, at the rear of the input piston 26. The input plunger 29 is guided slidably in the axial direction. The distal end portion of the input plunger 29 is engaged with the rear end portion of the input piston 26 slidably relative to the latter. The distal end portion of the input rod 30 is joined to the rear end portion of the input plunger 29 through a ball joint 31 in such a manner as to permit the input rod 30 to tilt to some extent relative to the input plunger 29. The input rod 30 has a distal end portion disposed to extend through the cylindrical portion 53A of the rear cover 3B and into the interior of the rear portion of the primary piston 10. The rear end portion of the input rod 30 extends to the outside from the cylindrical portion 53A. The rear end of the input rod 30 extended to the outside is joined to a brake pedal (not shown) through a clevis 30A. The input rod 30 moves axially in response to the operation of the brake pedal. The input rod 30 has a collar-shaped stopper abutment portion 32 formed on an intermediate part thereof disposed in the cylindrical portion 53A. The cylindrical portion 53A has a radially inwardly extending stopper 33 formed in the rear end portion thereof. The retract position of the input rod 30 is defined by abutment of the stopper abutment portion 32 against the stopper 33.

A first spring 34, which is a compression coil spring, is interposed between the intermediate wall 24 of the primary piston 10 and a spring retaining portion 26C formed at the rear end of the input piston 26. That is, the first spring 34 is disposed in an axial space formed by the intermediate wall 24 and the spring retaining portion 26C. Further, a second spring 36, which is a compression coil spring, is interposed between the rear end of the input plunger 29 and a spring retainer 35 attached to the proximal end of the primary piston 10. That is, the second spring 36 is disposed in an axial space formed by the rear end of the input plunger 29 and the spring retainer 35.

The input piston 26 and the input plunger 29 are resiliently held by the first spring 34 and the second spring 36 in a neutral position shown in FIG. 1, i.e. a position where the spring forces of the first and second springs 34 and 36 balance with each other. The input piston 26 and the input plunger 29 are movable forward and rearward from the neutral position relative to the primary piston 10. That is, the input piston 26 and the input plunger 29 can move relative to the primary piston 10 by extending and compressing the first spring 34 and the second spring 36.

The housing 3 accommodates a ball-screw mechanism 38, which is a rotation-rectilinear motion conversion mechanism. The ball-screw mechanism 38 is driven by an electric motor 2 disposed in the housing 3 to convert a rotary motion transmitted from the electric motor 2 into a rectilinear motion, thereby applying a thrust to the primary piston 10. The ball-screw mechanism 38 has a nut member 39, which is a rotary member, and a screw shaft 40, which is a rectilinear motion member. The nut member 39 is rotatably supported by a bearing 42A in the housing 3. The screw shaft 40 is formed in a hollow cylindrical shape. The screw shaft 40 is disposed to extend through the nut member 39 and into the interior of the cylindrical portion 53A of the housing 3. The screw shaft 40 is supported by the housing 3 axially movably but non-rotatably about its axis. More specifically, the screw shaft 40 is slidably fitted to a detent portion (not shown) formed in the stopper 33 and having a circumferential portion extending in the axial direction. The nut member 39 and the screw shaft 40 have spiral grooves 39A and 40A formed on their inner and outer peripheral surfaces, respectively. Between the spiral grooves 39A and 40A are loaded a plurality of balls 41, which are rolling elements, together with grease. Thus, as the nut member 39 rotates, the balls 41 roll along the spiral grooves 39A and 40A, causing the screw shaft 40 to move in the axial direction. The ball-screw mechanism 38 allows rotation and rectilinear motion to be converted into each other between the nut member 39 and the screw shaft 40.

The primary piston 10 has the spring retainer 35 at the rear end thereof inserted in the screw shaft 40. The retract position of the primary piston 10 relative to the screw shaft 40 is defined by abutment of the spring retainer 35 against an annular step portion 44 formed on the inner periphery of the screw shaft 40. Thus, as the screw shaft 40 advances, the primary piston 10 is pressed by the step portion 44 to advance, together with the screw shaft 40. The primary piston 10 can also advance solely away from the step portion 44.

Between the bottom of the front body part 51 of the front housing 3A and the spring retainer 35 at the rear end of the primary piston 10, a return spring 37, which is a compression coil spring, is interposed through a spring retaining member 37A. The return spring 37 urges the primary piston 10 and the screw shaft 40 toward the respective retract positions by the spring force thereof.

The electric motor 2 has a center axis parallel to the center axes of the master cylinder 4, the input rod 30, and the ball-screw mechanism 38 and is disposed in the motor casing part 50 and motor cover part 52 of the housing 3. The electric motor 2 is constructed as a three-phase DC brushless motor comprising a stator 65 having a plurality of coils and a rotor 60 provided with a plurality of permanent magnets. The electric motor 2 transmits its rotational force to the ball-screw mechanism 38 through a belt transmission mechanism 45, which is a rotation transmission mechanism. The belt transmission mechanism 45 has a pulley 45A, a pulley 45B, a belt 46, and a tension pulley 47 (see FIGS. 2 and 4; in FIG. 4, the pulley 45B is not shown). The pulley 45A is secured to an output shaft 2A, which is a rotary shaft member of the electric motor 2. In this embodiment, the pulley 45A and the output shaft 2A are rotary members of the rotation transmission mechanism. The pulley 45B is secured to the nut member 39 of the ball-screw mechanism 38. The belt 46 is wound between the above-described pulleys 45A and 45I. The tension pulley 47 presses the belt 46 from the outside to apply an appropriate tension to the belt 46. In this embodiment, the output shaft 2A of the electric motor 2 constitutes a rotary member of the rotation transmission mechanism and also constitutes a rotary shaft member of the electric motor.

Next, the housing 3 and the belt transmission mechanism 45 will be explained in more detail.

Figure 4:
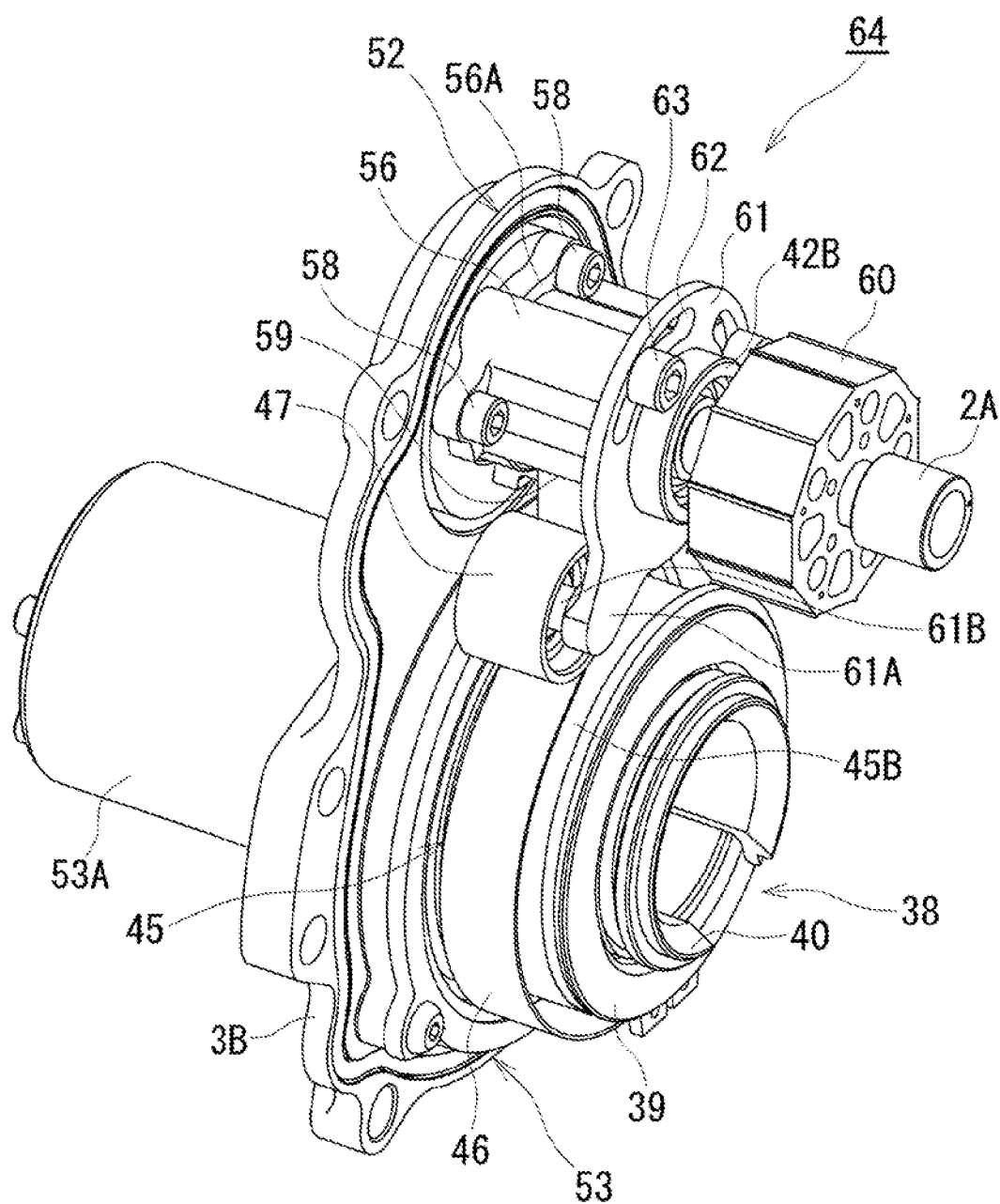
FIG. 4 is a perspective view of a rear housing subassembly of the electric motor-driven booster shown in FIG. 1.

Referring mainly to FIGS. 1 and 4, the nut member 39 of the ball-screw mechanism 38, which has one pulley 45B of the belt transmission mechanism 45 secured to an axially intermediate portion of the outer periphery thereof, is rotatably held by the bearing 42A, which is a ball bearing attached to the rear body part 53 of the rear housing 3B. The bearing 42A is secured to an annular bearing support portion 55 integrally formed with the rear body part 53 of the rear housing. In this embodiment, the bearing 42A is press-fitted at its outer periphery to the bearing support portion 55. The nut member 39 is held by the rear body part 53, i.e. the rear housing 3B, at only one end thereof, that is, only an end on the side thereof closer to the brake pedal (right-hand side in FIG. 1) which is supported by the bearing 42A. The other end of the nut member 39 is not supported.

The output shaft 2A, which is a rotary shaft member of the electric motor 2 and fitted with the other pulley 45A of the belt transmission mechanism 45, is held by the rear housing 31B through a pair of bearings 42B and 42C, which are ball bearings disposed to face each other across the pulley 45A. One bearing 42B is secured directly to the motor cover part 52 of the rear housing 3B. The other bearing 42C is secured to the motor cover part 52 through a substantially circular cylindrical bearing support member 56. The one bearing 42B is secured to an annular bearing support portion 57 formed on the motor cover part 52. In this embodiment, the bearing 42B is press-fitted into the bearing support portion 57. The bearing support member 56 has one end portion fitted to the outer peripheral portion of the bearing support portion 57, thereby being concentrically positioned with respect to the bearing 42B, that is, the output shaft 2A. The bearing support member 56 has a flange portion 56A formed at one end thereof and is secured to the motor cover part 52 with a plurality of bolts 58 inserted through the flange portion 56A. The other bearing 42C is secured to the inner peripheral portion at the other end of the bearing support member 56. In this embodiment, the bearing 42C is press-fitted to the inner peripheral portion at the other end of the bearing support member 56. The sidewall of the bearing support member 56 is provided with a cut portion 59. The cut portion 59 allows passage of the belt 46 wound around the pulley 45A disposed in the bearing support member 56. The output shaft 2A of the electric motor 2 is held at only one end thereof by the bearings 42B and 42C secured to the motor cover part 52 of the rear housing 3B. The other end of the output shaft 2A, which carries the rotor 60, is not held.

A ring-shaped support bracket 61 supporting the tension pulley 47 is secured to the end portion of the bearing support member 56, which is fitted with the bearing 42C. The support bracket 61 rotatably supports the tension pulley 47 with a shaft portion 61B extending parallel to the output shaft 2A from the distal end of an arm portion 61A extending radially outward. The support bracket 61 is secured to the bearing support member 56 by a plurality of bolts 63 inserted through a plurality of slots 62, respectively, each of which extends in the circumferential direction of the support bracket 61. The support bracket 61 allows adjustment of the tension of the belt 46 wound between the pulleys 45A and 45B by loosening and revolving the bolts 63 along the slots to change the position of the tension pulley 47. Transmission members of the rotation transmission mechanism in this embodiment include the above-described tension pulley 47, support bracket 61 and belt 46. These members are held by the rear housing 3B.

Thus, as shown in FIG. 4, the rear housing 3B has various components subassembled thereto to form a rear housing subassembly 64, the various components including the nut member 39 of the ball-screw mechanism 38 rotatably supported by the bearing 42A, the shaft member 40 engaged with the nut member 39, the output shaft 2A of the electric motor 2 rotatably supported by the bearings 42B and 42C, the pulley 45B secured to the nut member 39, the pulley 45A secured to the output shaft 2A, the belt 46 wound between the pulleys 45A and 45B, and the tension pulley 47 mounted to the bearing support member 56 through the support bracket 61.

Figure 3:
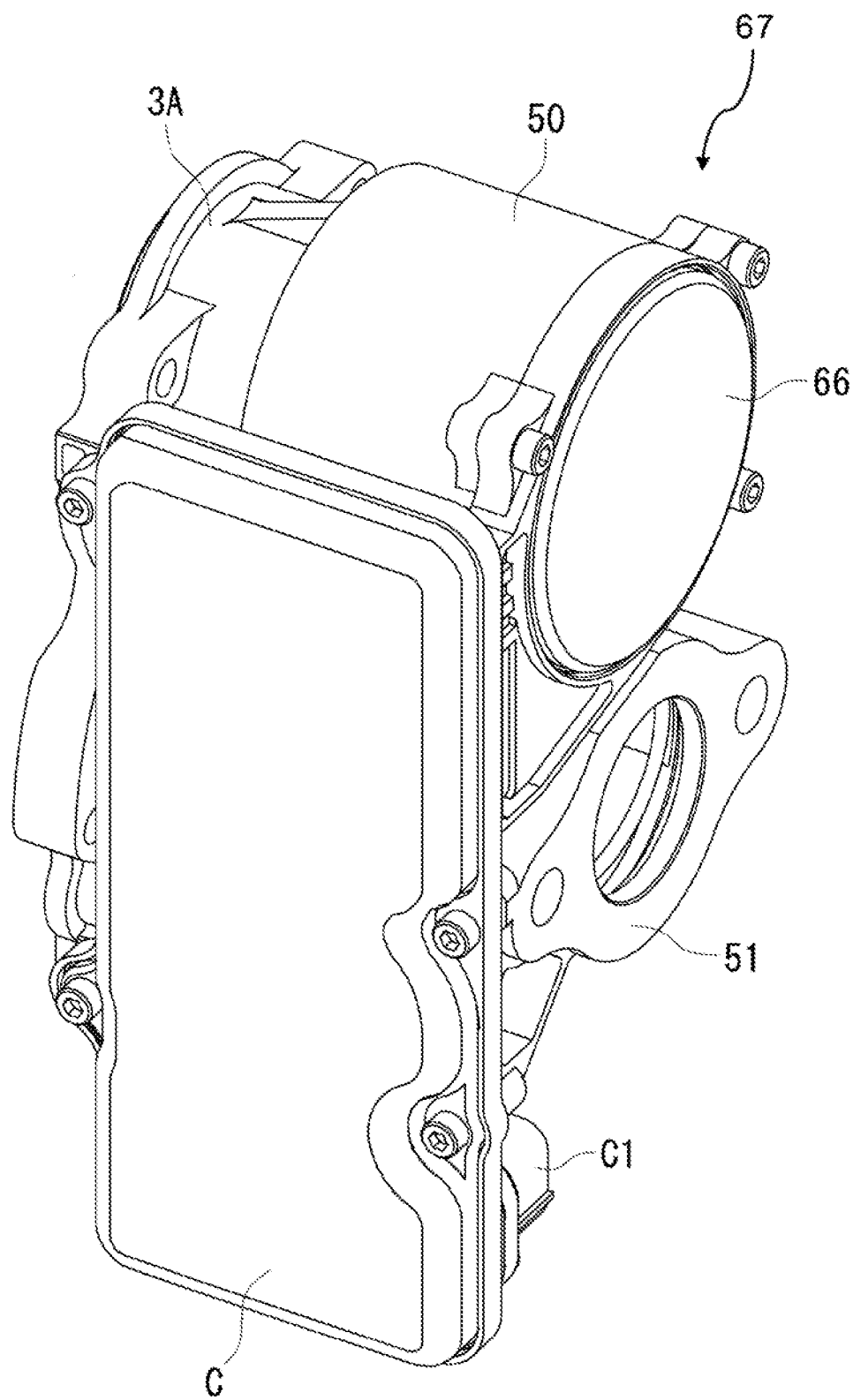
FIG. 3 is a perspective view of a front housing subassembly of the electric motor-driven booster shown in FIG. 1.

On the other hand, as shown in FIG. 3, the front housing 3A has various components subassembled thereto to form a front housing subassembly 67, the various components including the stator 65 (see FIG. 1) of the electric motor 2, a front cover 66 closing the opening at the front end of the motor casing part 50, and the controller C.

The electric motor-driven booster 1 is provided with a rotational position sensor (not shown) detecting the rotational position of the electric motor 2 and a stroke sensor 70 detecting the stroke of the input rod 30. The controller C controls the operation of the electric motor 2 on the basis of output signals from the above-described sensors. The controller C is connected appropriately to in-vehicle controllers for executing various brake control operations such as regenerative cooperative control, brake assist control, and automatic brake control.

The following is an explanation of the operation of the electric motor-driven booster 1 structured as stated above.

When the brake pedal is operated to advance the input rod 30, the controller C controls the operation of the electric motor 2 on the basis of the amount of operation of the brake pedal, that is, the stroke of the input rod 30. In response to the control, the electric motor 2 rotationally drives the nut member 39 of the ball-screw mechanism 38 through the pulleys 45A, 45B and the belt 46. The rotational drive of the nut member 39 causes the screw shaft 40 to advance, and the step portion 44 of the screw shaft 40 presses the spring retainer 35 of the primary piston 10 to propel the primary piston 10. Consequently, the primary piston 10 follows the stroke of the input rod 30. As a result, a hydraulic pressure is generated in the primary chamber 12. The hydraulic pressure propels the secondary piston 11 and is transmitted to the secondary chamber 13. In this way, a brake hydraulic pressure is generated in the master cylinder 4 and supplied to the wheel cylinder of each wheel to generate braking force by friction braking.

When the brake pedal operation is canceled, the controller C reversely rotates the electric motor 2 on the basis of the stroke of the input rod 30, causing the primary piston 10 and the secondary piston 11 to retract. The retraction of the pistons 10 and 11 reduces the brake hydraulic pressure in the master cylinder 4 and hence cancels the braking force. It should be noted that the primary piston 10 and the secondary piston 11 operate in the same way; therefore, only the operations of the primary piston 10 and the constituent elements associated therewith will be explained in the following description.

When hydraulic pressure is generated, the small-diameter portion 26A of the input piston 26 receives the hydraulic pressure in the primary chamber 12 and transmits, i.e. feedbacks the received hydraulic pressure to the brake pedal through the input plunger 29 and the input rod 30 as a reaction force to the brake pedal operating force. Thus, it is possible to generate a desired braking force with a predetermined boost ratio (ratio of the hydraulic pressure output to the brake pedal operating force). The controller C can adjust the relative positions of the input piston 26 and the primary piston 10, which follows the input piston 26, by controlling the operation of the electric motor 2. More specifically, when the controller C adjusts the position of the primary piston 10 forward, i.e. toward the master cylinder 4, relative to the stroke position of the input piston 26, it is possible to increase the hydraulic pressure output with respect to the operation of the brake pedal. When the controller C adjusts the position of the primary piston 10 rearward, i.e. toward the brake pedal, relative to the stroke position of the input piston 26, it is possible to reduce the hydraulic pressure output with respect to the operation of the brake pedal. As a result, it is possible to execute brake control operations such as boost control, brake assist control, inter-vehicle control, and regenerative cooperative control.

If the ball-screw mechanism 38 should become unable to operate because of a failure in the electric motor 2 or the controller C, for example, the forward end of the large-diameter portion 26B of the input piston 26 presses the intermediate wall 24 of the primary piston 10 in response to the operation of the brake pedal. Consequently, the primary piston 10 is allowed to advance by the brake pedal operating force, and a hydraulic pressure can be generated in the master cylinder 4. Thus, the braking function can be maintained.

The following is an explanation of a method of assembling the electric motor-driven booster 1.

The electric motor-driven booster 1 is assembled by assembling each of subassemblies, i.e. the front housing subassembly 67, the rear housing subassembly 64, and the piston subassembly, and thereafter combining together each subassembly and the master cylinder 4. The following is an outline of a method of assembling each subassembly and a method of assembling the electric motor-driven booster 1.

The front housing subassembly 67 is assembled by installing various components in the front housing 3A. First, the stator 65 of the electric motor 2 is installed in the motor casing part 50 of the front housing 3A, and thereafter a rotational position sensor (not shown) is installed at the opening of the motor casing part 50. Next, wires are connected to busbars (not shown) for connecting the stator 65 and sensors such as a resolver to the controller C. Thereafter, the opening of the motor casing part 50 is closed with the front cover 66. With this, the assembling of the front housing subassembly 67 is completed.

The rear housing subassembly 64 is assembled by installing various components in the rear housing 3B. First, the bearing 42A is press-fitted into the bearing support portion 55 of the rear body part 53 of the rear housing 3B. In addition, the stopper 33 is non-rotatably secured to the cylindrical portion 53A of the rear body part 53. Thereafter, the ball-screw mechanism 38 fitted with the pulley 45B is installed in the rear housing 3B so as to be fitted to the detent portion of the stopper 33 and the bearing 42A. Next, the bearing 42B is press-fitted into the bearing support portion 57 of the motor cover part 52 of the rear housing 3B. Thereafter, the distal end of the output shaft 2A fitted with the pulley 45A is fitted into the bearing 42B, thereby installing the output shaft 2A in the rear housing 3B. Thus, the nut member 39, which is a rotary member of the ball-screw mechanism 38, is held by the rear housing 3B, which is a housing member.

In this state, the belt 46 is stretched between the pulley 45A and the pulley 45B. With the belt 46 installed thereto, the bearing support member 56 having the bearing 42C secured thereto is secured to the motor cover part 52 with a plurality of bolts 58, with the output shaft 2A inserted through the bearing 42C. Thus, the pulley 45A, which is a rotary member of the belt transmission mechanism 45, and the output shaft 2A, which is a rotary shaft member of the electric motor 2, are held by the rear housing 3B, which is a housing member. Thereafter, the support bracket 61 is attached to the bearing support member 56 with the bolts 63. The support bracket 61 is secured while adjusting the tension of the belt 46 by pressing the tension pulley 47 against the belt 46. Then, the rotor 60 of the electric motor 2 is press-fitted onto the other end of the output shaft 2A. With this, the assembling of the rear housing subassembly 64 is completed.

As has been stated above, in this embodiment, the belt 46 can be adjusted for tension by the tension pulley 47 in the state of the rear housing subassembly 64.

The piston subassembly is assembled by installing various components in the primary piston 10. First, the first spring 34 and the input piston 26 are inserted into the primary piston 10 from the proximal end of the latter, and the small-diameter portion 26A of the input piston 26 is inserted through the guide bore 25 of the intermediate wall 24, thereby disposing the input piston 26 in the primary piston 10. Next, the input plunger 29 fitted with the input rod 30 is inserted into the primary piston 10 from the proximal end of the latter, and the distal end of the input plunger 29 is fitted into the input piston 26. In this state, the second spring 36 is inserted into the primary piston 10 from the proximal end of the latter, and the spring retainer 35 is screwed into the proximal end of the primary piston 10. Then, the seal 27 and the seal retaining member 27A are inserted into the primary piston 10 from the distal end of the latter to seal between the intermediate wall 24 and the input piston 26. Thereafter, the spring 22 is secured to the primary piston 10. With this, the assembling of the piston subassembly is completed.

Then, the piston assembly, the spring retaining member 37A, and the return spring 37 are inserted into the rear housing subassembly 64, and thereafter the front housing subassembly 67 and the rear housing subassembly 64 are joined together with a plurality of bolts 54. Thereafter, the master cylinder 4 having the spring 23 and the secondary piston 11 inserted therein is fitted to the primary piston 10 and secured to the front housing 3A. Finally, the control board of the controller C is secured to the sides of the motor casing part 50 and front body part 51 of the front housing 3A. Thus, the assembling of the electric motor-driven booster 1 is completed.

As has been stated above, in this embodiment, the belt 46 can be adjusted for tension with the tension pulley 47 in the state of the rear housing subassembly 64. Therefore, there is no need to provide an opening which has heretofore been provided in the housing in order to adjust the tension of the belt after the electric motor-driven booster has been assembled, and it is unnecessary to provide a member for closing the opening. Accordingly, the electric motor-driven booster can be manufactured with increased efficiency.

In addition, the nut member 39 of the ball-screw mechanism 38 and the output shaft 2A of the electric motor 2, which are respectively fitted with the pulleys 45B and 45A of the belt transmission mechanism 45, can be efficiently supported by the bearing 42A and the bearings 42B and 42C only at their portions that are mainly subjected to load. Accordingly, the number of bearings required can be reduced as compared with the conventional electric motor-driven booster. As a result, it is possible to reduce the parts count and the number of man-hours required for manufacturing the electric motor-driven booster 1. Because the rear housing 3B, which is a single member, is configured to receive a driving force from the electric motor 2 and a reaction force from the hydraulic pressure generated in the master cylinder 4 by the primary piston 10, the driving force and the reaction force can be efficiently supported by increasing the rigidity of the rear housing 3B.

It should be noted that, in this embodiment, the belt transmission mechanism 45 is used as a transmission mechanism for transmitting rotational force between the electric motor 2 and the ball-screw mechanism 38. However, the transmission mechanism is not limited to the belt transmission mechanism 45. It is also possible to use other publicly known transmission mechanisms such as a gear transmission mechanism, a chain transmission mechanism, etc. In this case also, transmission members of such a transmission mechanism, e.g. transmission gears or a chain tensioner, are held by the rear housing 3B.

In this embodiment, the nut member 39 of the ball-screw mechanism 38 and the output shaft 2A of the electric motor 2, which are respectively fitted with the pulleys 45B and 45A of the belt transmission mechanism 45, are supported by the rear housing 3B. However, the present invention is not limited thereto. The nut member 39 and the output shaft 2A may be supported by the front housing 3A. Further, the housing may comprise three or more members, and the nut member 39 and the output shaft 2A of the electric motor 2 may be supported by any one of the three or more members.

The electric motor-driven booster of this embodiment is an electric motor-driven booster in which a rotary motion of an electric motor is transmitted through a rotation transmission mechanism to a rotation-rectilinear motion conversion mechanism where the rotary motion is converted into a rectilinear motion to move a piston in a master cylinder. The rotation transmission mechanism and the rotation-rectilinear motion conversion mechanism are accommodated in a housing formed by combining together at least two housing members, and a rotary member of the rotation transmission mechanism and a rotary member of the rotation-rectilinear motion conversion mechanism are held by one housing member of the at least two housing members.

With the above-described structure, the electric motor-driven booster can be manufactured with increased efficiency.

In the electric motor-driven booster of this embodiment, the one housing member that holds the rotary member of the rotation transmission mechanism and the rotary member of the rotation-rectilinear motion conversion mechanism holds a rotary shaft member of the electric motor.

With the above-described structure, one housing member holds the rotary shaft member of the electric motor and the rotary member of the rotation-rectilinear motion conversion mechanism. Therefore, it is easy to adjust coaxiality between the two shafts, and the electric motor-driven booster can be manufactured with increased efficiency.

In the electric motor-driven booster of this embodiment, the rotary member of the rotation transmission mechanism is a rotary member of the electric motor, and the rotary member is held through a bearing secured to the one housing member.

With the above-described structure, one housing member holds the rotary member of the electric motor and the rotary member of the rotation-rectilinear motion conversion mechanism. Therefore, it is easy to adjust coaxiality between the two shafts, and the electric motor-driven booster can be manufactured with increased efficiency.

In the electric motor-driven booster of this embodiment, a bearing for the rotary member of the rotation-rectilinear motion conversion mechanism is provided in only the one housing member that holds the rotary member of the rotation transmission mechanism and the rotary member of the rotation-rectilinear motion conversion mechanism.

With the above-described structure, it is possible to reduce the number of bearings provided in the electric motor-driven booster as compared with the conventional electric motor-driven booster. As a result, it is possible to reduce the parts count and the number of man-hours required for manufacturing.

In the electric motor-driven booster of this embodiment, the one housing member that holds the rotary member of the rotation transmission mechanism and the rotary member of the rotation-rectilinear motion conversion mechanism receives a force from a hydraulic pressure in the master cylinder, the force being transmitted to the one housing member through the rotation-rectilinear motion conversion mechanism.

With the above-described structure, run-out of the rotary member of the rotation transmission mechanism can be suppressed by an axial force which is a force received from a hydraulic pressure in the master cylinder, the force being transmitted through the rotation-rectilinear motion conversion mechanism, and it is possible to suppress abnormal noise during the operation of the electric motor-driven booster.

In the electric motor-driven booster of this embodiment, the one housing member that holds the rotary member of the rotation transmission mechanism and the rotary member of the rotation-rectilinear motion conversion mechanism has a mounting part through which the one housing member is mounted to a vehicle.

In the electric motor-driven booster of this embodiment, the rotation transmission mechanism has a transmission member provided between itself and the rotation-rectilinear motion conversion mechanism, the transmission member being held by the one housing member.

With the above-described structure, a rotationally driving mechanism can be subassembled to one housing member, and the rotation transmission mechanism can be adjusted in the state of a subassembly. Accordingly, the electric motor-driven booster can be manufactured with increased efficiency.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Application No. 2014-224371 filed on Nov. 4, 2014. The entire disclosure of Japanese Patent Application No. 2014-224371 filed on Nov. 4, 2014 including specification, claims, drawings and summary is incorporated herein by reference in its entirety.

LIST OF REFERENCE SIGNS

1: electric motor-driven booster
2: electric motor
2A: output shaft (rotary member, rotary shaft member)
3: housing
3B: rear housing (housing member)
4: master cylinder
10: primary piston (piston)
30: input rod (input member)
38: ball-screw mechanism (rotation-rectilinear motion conversion mechanism)
39: nut member (rotary member)
45: belt transmission mechanism (rotation transmission mechanism)
45A: pulley (rotary member)
45B: pulley (rotary member)

The invention claimed is:

1. An electric motor-driven booster in which a rotary motion of an electric motor is transmitted through a rotation transmission mechanism to a rotation-rectilinear motion conversion mechanism where the rotary motion is converted into a rectilinear motion to move a piston in a master cylinder, wherein:
the rotation transmission mechanism and the rotation-rectilinear motion conversion mechanism are accommodated in a housing formed by combining together at least a first housing member and a second housing member;
a rotary member of the rotation transmission mechanism and a rotary member of the rotation-rectilinear motion conversion mechanism are held by only the first housing member of the first and second housing members;
the first housing member holds a rotary shaft of the electric motor, and
a bearing for the rotary member of the rotation-rectilinear motion conversion mechanism is supported by only the first housing member, and is not supported by the second housing member,
wherein the rotary shaft of the electric motor is also used as the rotary member of the rotation transmission mechanism, the rotary shaft being held through a pair of bearings supported by the first housing member, and one bearing of the pair of bearings is supported by a bearing support member extending from the first housing member.

2. The electric motor-driven booster of claim 1, wherein the first housing member receives a force from a hydraulic pressure in the master cylinder, the force being transmitted to the first housing member through the rotation-rectilinear motion conversion mechanism.

3. The electric motor-driven booster of claim 2, wherein the first housing member has a mounting part through which the first housing member is mounted to a vehicle.

4. The electric motor-driven booster of claim 3, wherein the rotation transmission mechanism has a transmission member provided between itself and the rotation-rectilinear motion conversion mechanism, the transmission member being held by the first housing member.

5. The electric motor-driven booster of claim 1, wherein the first housing member receives a force from a hydraulic pressure in the master cylinder, the force being transmitted to the first housing member through the rotation-rectilinear motion conversion mechanism.

6. The electric motor-driven booster of claim 1, wherein the first housing member has a mounting part through which the first housing member is mounted to a vehicle.

7. The electric motor-driven booster of claim 1, wherein the rotation transmission mechanism has a transmission member provided between itself and the rotation-rectilinear motion conversion mechanism, the transmission member being held by the first housing member.

* * * * *